United States Patent
Kim

[19]

[11] Patent Number: 5,929,547
[45] Date of Patent: Jul. 27, 1999

[54] ROTOR CORE HAVING SLOTS FOR RECEIVING PERMANENT MAGNETS

[75] Inventor: Tae-duk Kim, Suwon, Rep. of Korea

[73] Assignee: Samsung Electronics Co., Ltd., Suwon-City, Rep. of Korea

[21] Appl. No.: 09/076,841

[22] Filed: May 13, 1998

[30]   Foreign Application Priority Data

May 13, 1997 [KR] Rep. of Korea .................. 1997/18592

[51] Int. Cl.[6] ...................................................... H02K 1/27
[52] U.S. Cl. ........................... 310/156; 310/162; 310/261
[58] Field of Search ..................................... 310/156, 261, 310/264, 162, 163, 164, 165, 166, 167, 168, 185, 186, 190, 216

[56]   References Cited

U.S. PATENT DOCUMENTS 3,840,763 10/1974 Baumann et al. ...................... 310/156
4,476,408 10/1984 Honsinger ............................... 310/156

*Primary Examiner*—Thomas M. Dougherty
*Assistant Examiner*—Burton S. Mullins
*Attorney, Agent, or Firm*—Burns, Doane, Swecker & Mathis, L.L.P.

[57]   ABSTRACT

A rotor for use in an electrical mechanism comprises a core in which there are formed first slots extending in a direction substantially perpendicular to a radius of the core. A plurality of second slots is formed in the core, the second slots extending from respective ends of the first slots, whereby there is provided a plurality of pairs of adjacently disposed second slots. The second slots of each pair extend from different first slots and converge toward one another in a direction toward an outer periphery of the core. Permanent magnets are disposed in the first and second slots.

3 Claims, 5 Drawing Sheets

ROTOR CORE HAVING SLOTS FOR RECEIVING PERMANENT MAGNETS

BACKGROUND OF THE INVENTION

1. Field of the Invention

The present invention relates to a rotor structure of an electrical motor, and more particularly, to a rotor structure of the type in which permanent magnets are inserted.

2. Description of the Related Art

Various types of motors are being developed because motors are essential for obtaining revolving power. Nevertheless, motors occupy a large portion of the total volume and weight of the electronic devices in which they are incorporated. Thus, the R&D trend is formed for developing small sized and lightweight motors for achieving small sized and lightweight electronic devices.

An AC motor adaptable for various electric home appliances obtains revolving power by producing a revolving magnetic field from an AC voltage supplied to a stator. Reducing the size of an AC motor is difficult because of various electric losses occurring during electric current flow in a rotor, and difficulty in performing a coil winding process on the core of a motor rotor.

Furthermore, demand for a DC motor is rapidly growing in devices requiring even torque characteristics, so, R&D in connection with DC motors is progressing. However, the life span of a DC motor is short because a DC motor basically requires a commutator that produces mechanical losses and generates friction between the commutator and a rotor shaft.

Accordingly, R&D is being performed for a motor that obtains torque without a commutator. A brushless and a switched reluctance motor are representative results of that research. The brushless motor uses an electronic method as a substitute for a commutator through turning electric current and magnetic field direction, subsequently, and installing a permanent magnet on a rotor. The switched reluctance motor in which rotor revolution depends on a reluctance change of the magnetic field is developed by supplying each phase of AC electric current to a stator, installing a permanent magnet on a rotor and switching current flowing through each phase of winding coils on a stator and a permanent magnet of a rotor.

The rotors for such a brushless and a switched reluctance motor need to be operated without electric losses and vibration at the high rotary speeds at which such motors operate.

Permanent magnet type rotors used for general purposes are divided into a permanent magnet exterior type rotor and a permanent magnet inserted type rotor.

FIG. 1 is a perspective view illustrating a permanent magnet exterior type rotor of a conventional motor.

FIG. 2 is a cross-sectional view illustrating a permanent magnet inserted type rotor of a conventional motor.

As shown in FIG. 1, a permanent magnet exterior type rotor is composed of a rotor core 3 formed by stacking steel rotor plates 2 made of thin silicon steel. Permanent magnets 5, each formed as a segment of a cylinder, are bonded to the outer peripheral surface of the core by adhesive 4. A hole 1 is formed in the central part of the core for receiving a rotor shaft (not shown) by press fit.

In such a permanent magnet exterior type rotor, the adhesive may lose adhesive power according to long term use, whereby a permanent magnet 5 may become separated from the core 3. In addition, at a high rotary speed of the motor, a permanent magnet 5 may separate from the rotor core 3 due to the centrifugal force being produced.

Consequently, a permanent magnet inserted type rotor as shown in FIG. 2 is usually used for high speed applications.

As shown in FIG. 2, in the permanent magnet inserted type rotor, straight magnet receiving slots 21 of predetermined length are symmetrically formed about the center of steel plate 2 perpendicular to a radial direction.

When the rotor core 3 is formed by stacking steel rotor plates 2, the straight magnet receiving slots 21 are formed in the rotor core 3 in the longitudinal direction. As shown in FIG. 3, a magnetic field is produced by permanent magnets 7 disposed in the straight magnet receiving slots 21.

However, in such a rotor structure, a rotor may become damaged by high levels of stress occurring at the ends 22 of each straight magnet receiving slot 21. That stress is greater than the stress occurring elsewhere in the rotor, producing an uneven stress distribution that may cause vibration and breakage of the rotor at a high rotary speed.

To solve the above-mentioned problem, much R&D has been performed, and one result of such efforts is described in Japanese Patent Application Disclosure Gazette No. 5-236,685, disclosed on Oct. 9, 1993.

In that patent application, an even stress distribution can be assured by straight permanent magnet receiving slots 21 having ends extending generally radially for a predetermined length, as shown in FIG. 4.

As shown in FIG. 4, in the steel rotor plate 2 of the permanent magnet inserted type rotor 6, straight magnet receiving slots 21 of a predetermined length are formed perpendicular to the radial direction, and have their ends are connected to extended slots 42 of predetermined length in the radial direction. Each radial slot 42 is parallel to another radial slot 42. An even stress distribution obtained by the presence of the radial slots 42 in the steel rotor plate 2 prevents motor vibration.

The presence of the radially extended slots 42 makes stress distribution even, but the energy is inefficiently consumed because a disturbing area 43, formed perpendicularly to the path of magnetic flux between adjacent parallel radial slots 42, may cause magnetic flux losses, as explained below.

FIG. 5 shows a magnetic flux distribution in a conventional motor. The magnetic flux, excited by electrification of winding coils on the stator 51 and traveling between the stator 51 and the rotor 6 through air gaps formed between the rotor 6 and the stator 51, is disturbed in the disturbing areas 43 disposed between the pairs of adjacent extended slots 42 of a rotor 6, so the magnetic flux path is distorted and magnetic resistance is increased. Furthermore, there occurs much magnetic flux leakage, i.e., magnetic flux produced by the permanent magnets of the rotor 6 does not flow to the air gap but rather circulates within the rotor 6.

FIG. 6 shows a torque measurement graph for the rotor shown in FIG. 2. As shown in FIG. 6, with reference to the mechanical angle in the direction of the motor revolution, the difference between the maximum torque value and the minimum torque value is large, and the ripple between the maximum torque value and the minimum torque value that may cause vibration is rapidly formed. Consequently, mechanical vibration and noises are produced. Also, the average torque per unit stacking of the rotor steel plate 2 is about 3 kg-cm.

SUMMARY OF THE INVENTION

It is, therefore, an object of the present invention to provide a motor maintaining harmonious magnetic flux flow, preventing magnetic flux leakage and energy losses, by forming extended slots in a direction adapted to the direction of the magnetic flux flow.

To achieve the above object, the present invention relates to a rotor adapted for use in an electrical mechanism. The rotor comprises a core defining a longitudinal axis. A plurality of first slots is formed in the core. Each first slot extends in a direction substantially perpendicular to a radius of the core and has opposite ends. A plurality of second slots is formed in the core, the second slots extending from respective ends of the first slots, whereby there is provided a plurality of pairs of adjacently disposed second slots. The second slots of each pair extend from a different first slot and converge toward one another in a direction toward an outer periphery of the core. Permanent magnets are disposed in the first slots and in the second slots.

Preferably, each second slot forms an obtuse angle with its respective first slot, the obtuse angle being in the range of 120 to 170 degrees.

BRIEF DESCRIPTION OF THE DRAWINGS

This present invention will now be described in more detail with reference to drawings, however, this present invention is not limited thereto.

DETAILED DESCRIPTION OF A PREFERRED EMBODIMENT OF THE INVENTION

Figure 1:
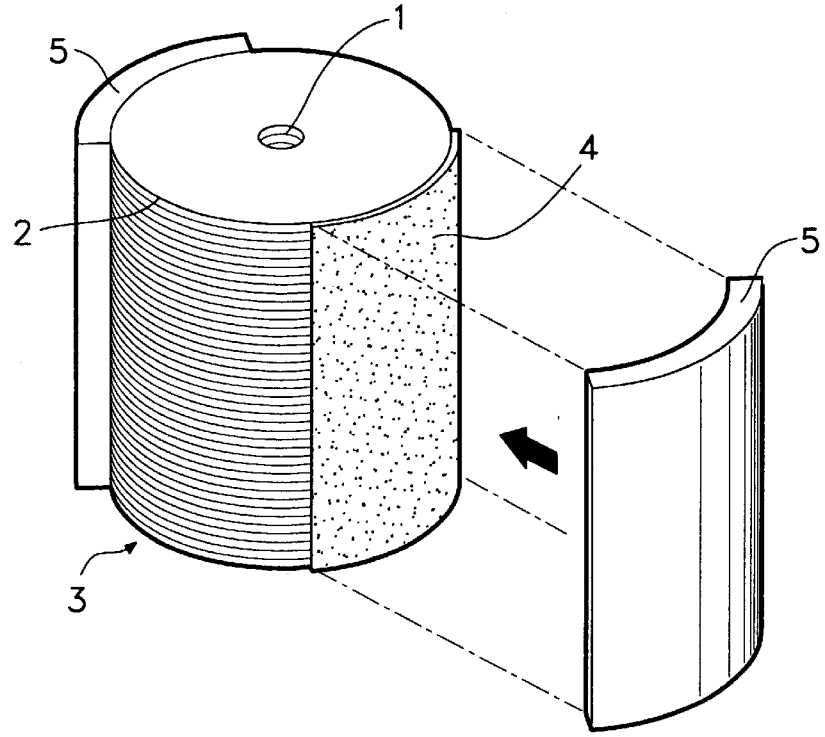
FIG. 1 is a perspective view illustrating a conventional permanent magnet exterior type rotor.
Figure 2:
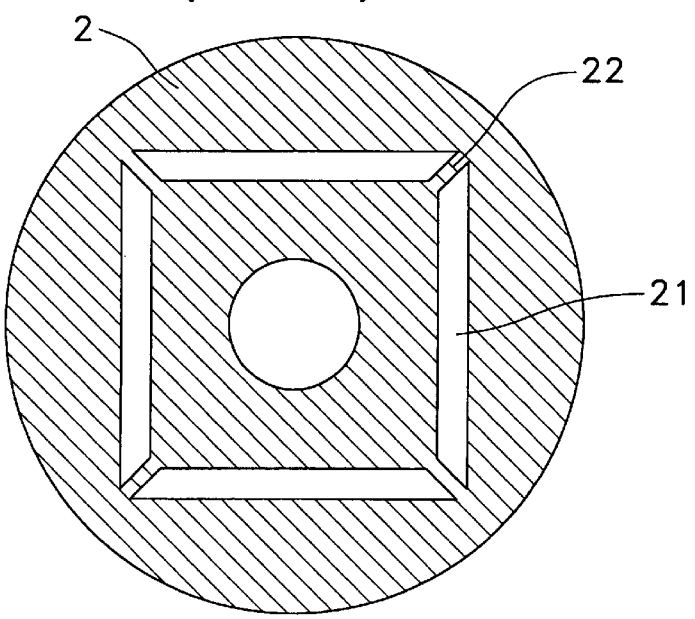
FIG. 2 is a cross-sectional view illustrating a conventional permanent magnet inserted type rotor.
Figure 3:
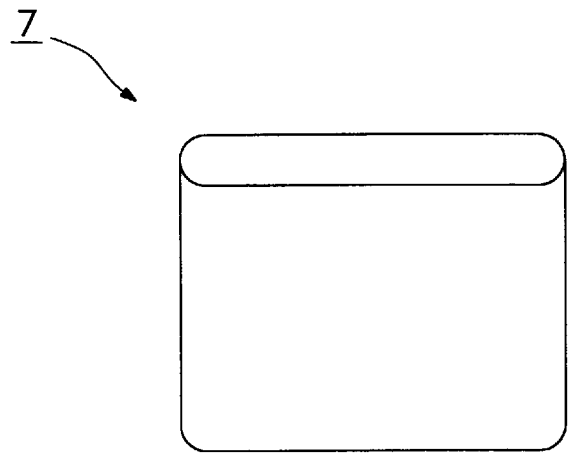
FIG. 3 is a perspective view illustrating a conventional permanent magnet adapted to be inserted in the permanent magnet receiving slots shown in FIG. 2.
Figure 4:
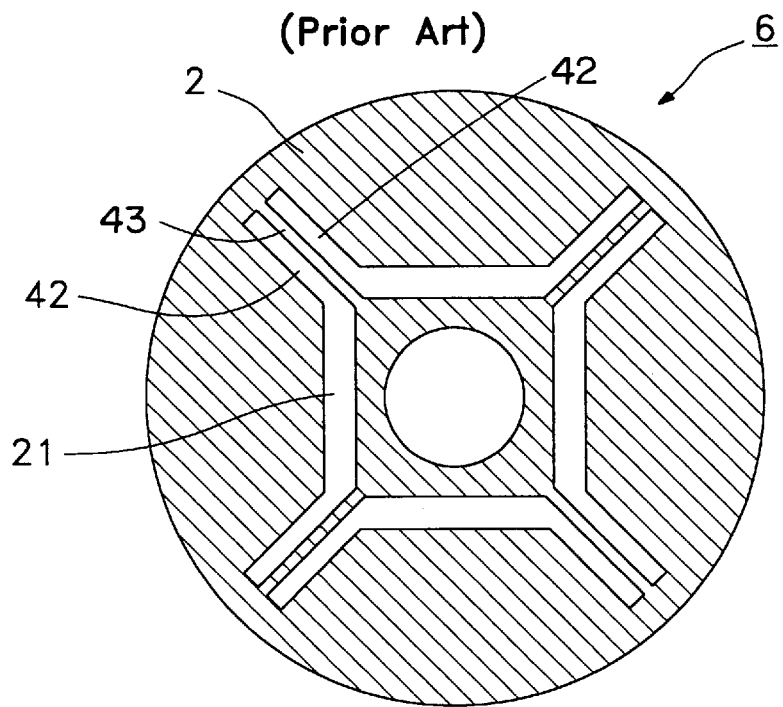
FIG. 4 is a cross sectional view through a steel plate of the conventional permanent magnet inserted type rotor having slots extending in the radial direction.
Figure 5:
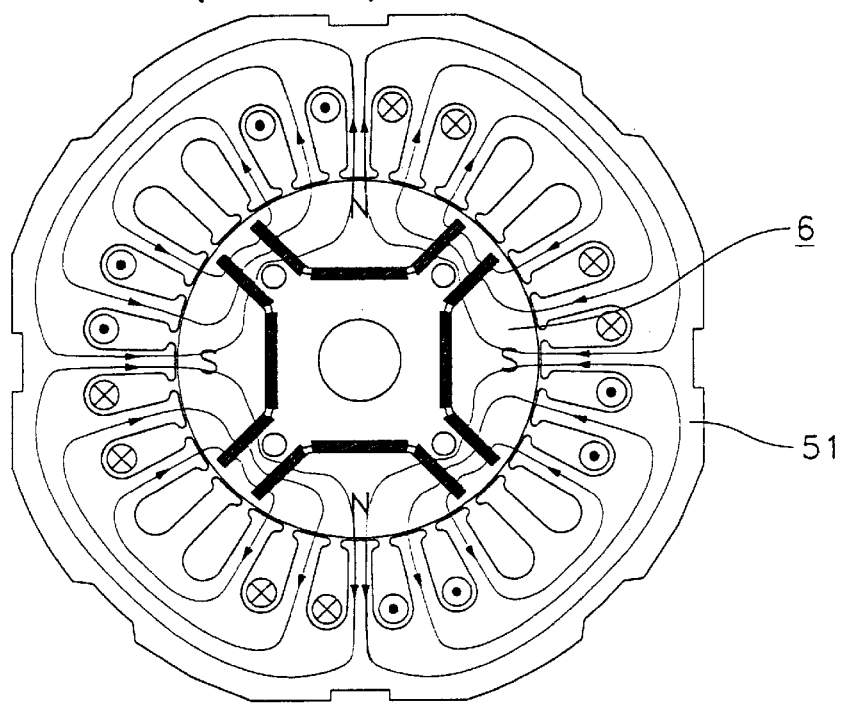
FIG. 5 shows a magnetic flux distribution in a conventional motor.
Figure 7:
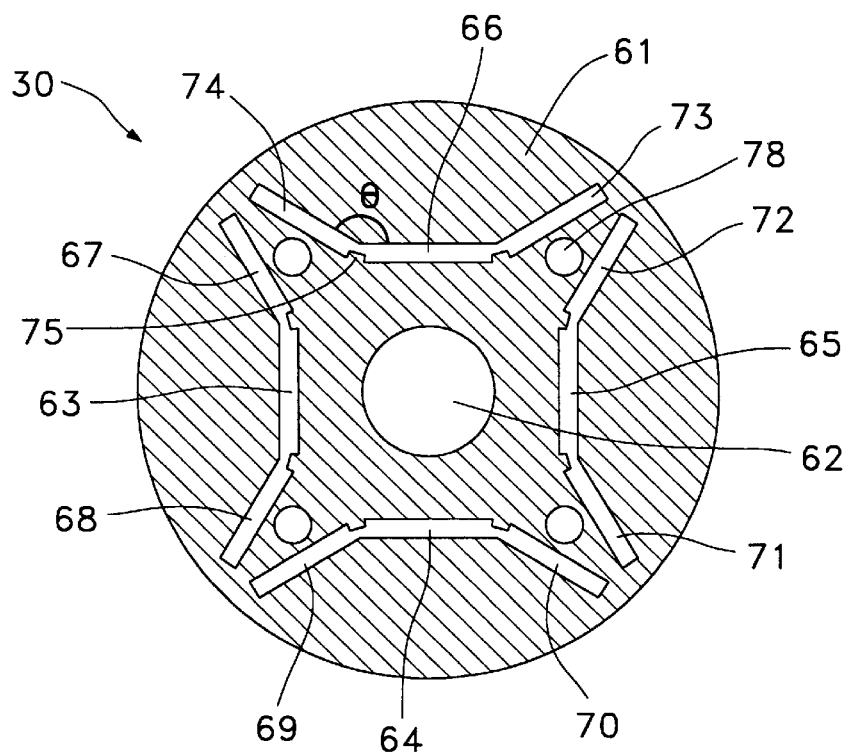
FIG. 7 is a cross sectional view of a steel rotor plate used in one embodiment of the present invention.
Figure 8:
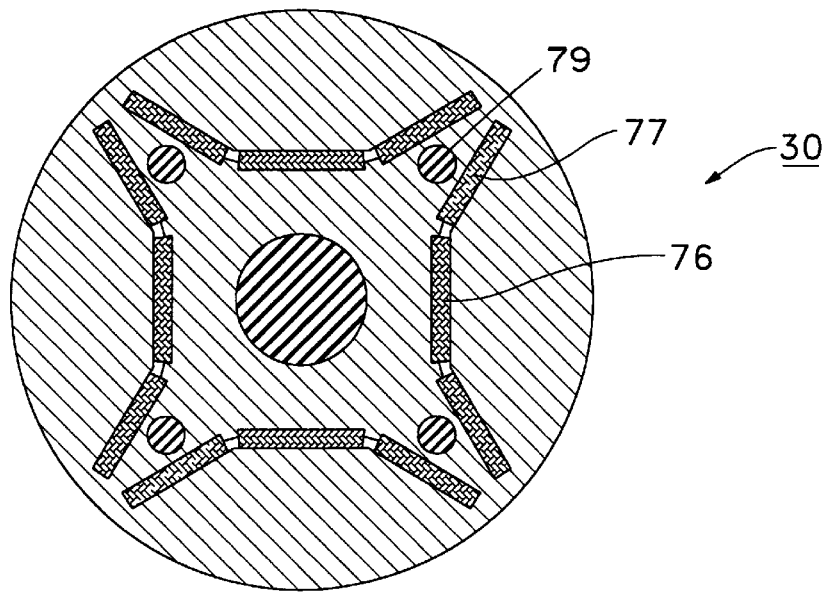
FIG. 8 is a view of FIG. 7 after permanent magnets have been installed.

Shown in FIGS. 7 and 8 is a rotor adapted for use in an electrical apparatus (not shown). A rotor shaft press-fit slot 62 for receiving a rotor shaft is formed in the central part of a core 61 of the rotor 30. Also formed in the core are first permanent magnet receiving slots 63, 64, 65 and 66 for receiving first permanent magnets 76, each slot arranged perpendicularly to a radial direction of the steel rotor plate 61. The first receiving slots may be formed during the molding of the steel rotor plate 61. Moreover, second permanent magnet receiving slots 67 to 74 for receiving second permanent magnets 77 are joined to respective ends of the first permanent magnet receiving slots 63, 64, 65 and 66. The second permanent magnet receiving slots 67–74 are inclined at a predetermined obtuse angle ($\theta$) relative to the first permanent magnet receiving slots 63–66. Inclined angles ($\theta$) in the range of 120 to 170 degrees are preferable for a harmonious magnetic flux flow. If the inclined angles ($\theta$) are less than 120 degrees, the effect is small, and if the inclined angles ($\theta$) are more than 170 degrees, magnetic flux flow is the same as in the prior art shown in FIG. 2.

The angle $\theta$ is of such magnitude that adjacent ones of the second slots 74 converge toward the outer periphery of the core 61. That is, as each of the adjacent second slots 74 gets closer to the peripheral surface of the core 30, the distance between the second permanent magnet receiving slots gets smaller. In other words, as the second permanent magnet receiving slot 68 (which is extended from the first permanent magnet receiving slot 63) and the adjacent second permanent magnet receiving slot 69 (which is extended from the first permanent magnet receiving slot 64) get closer to the outer peripheral surface, the distance between the two corresponding magnets 77 gets smaller. Because of that arrangement, the size of the disturbing area is reduced, whereby any distortion of the magnetic flux path is minimized.

Insertion of the permanent magnets 76 and 77 in the first and second permanent magnet receiving slots is guided by protruded parts 75 formed at the juncture of the associated first and second slots, and those parts 75 prevent tangential movement of the inserted magnets.

The rotor plates, after being stacked, are joined together by rivets or bolts 79 inserted through longitudinal holes 78 of the plates.

Figure 9:
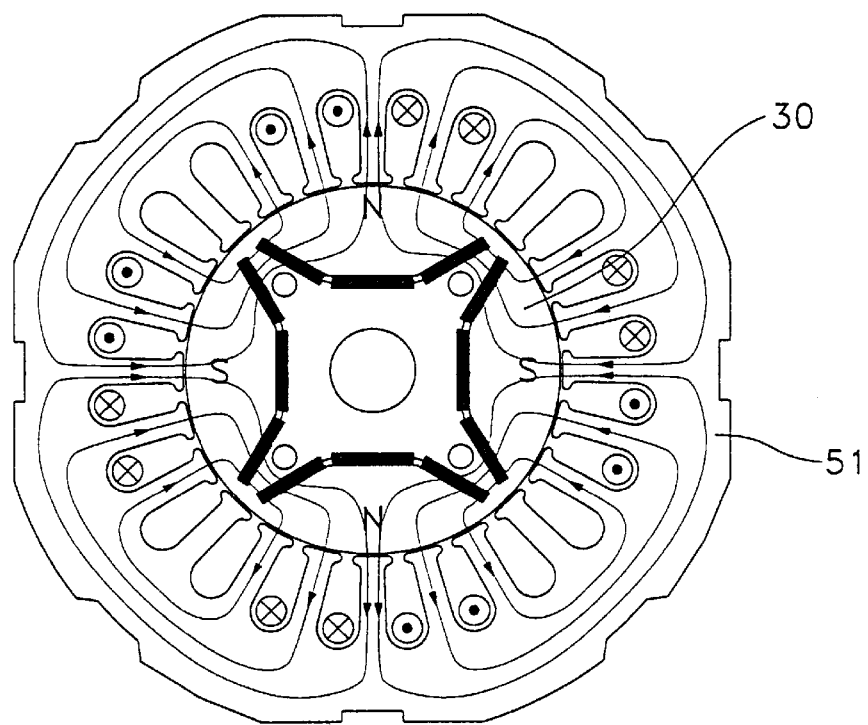
FIG. 9 shows a magnet flux distribution passing through a stator and a rotor of this present invention.

FIG. 9 shows a magnet flux distribution passing through the stator and the rotor of this present invention.

When electric current electrifies each phase of the rotor windings, for harmonious generation of the magnetic flux path, a magnetic flux is produced in the stator windings and permanent magnets 76 and 77 of the rotor 30, whereupon the rotor revolves. Due to the minimizing of flux path distortion achieved by the present invention, the magnetic flux density is larger than in the prior art. And, according to the magnetic flux efficiency increase due to decrease of unavailable magnetic flux, the torque is also larger than in the prior art for the same amount of the magnetic flux.

Figure 10:
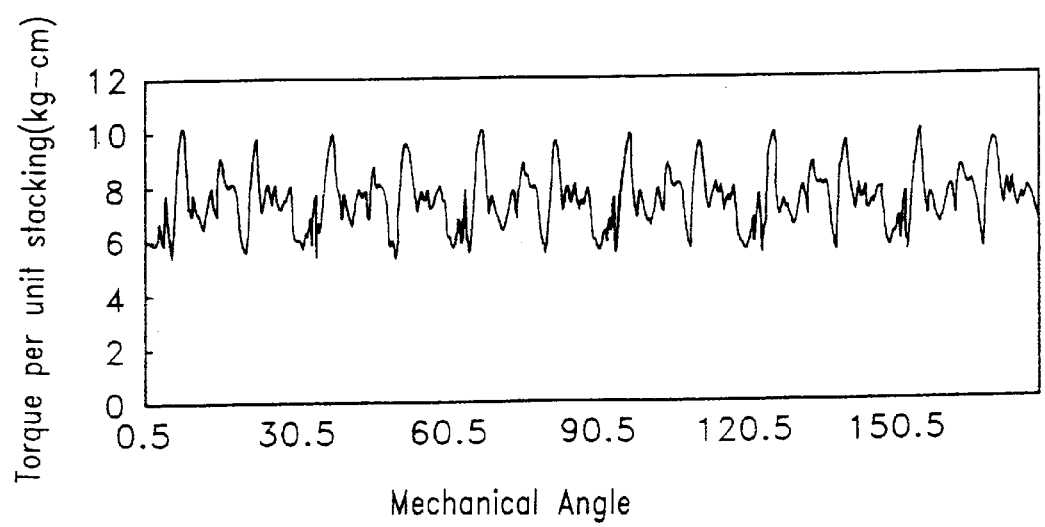
FIG. 10 shows a torque measurement graph of one embodiment of this present invention.

FIG. 10 is a torque measurement graph of one embodiment of this present invention.

Figure 6:
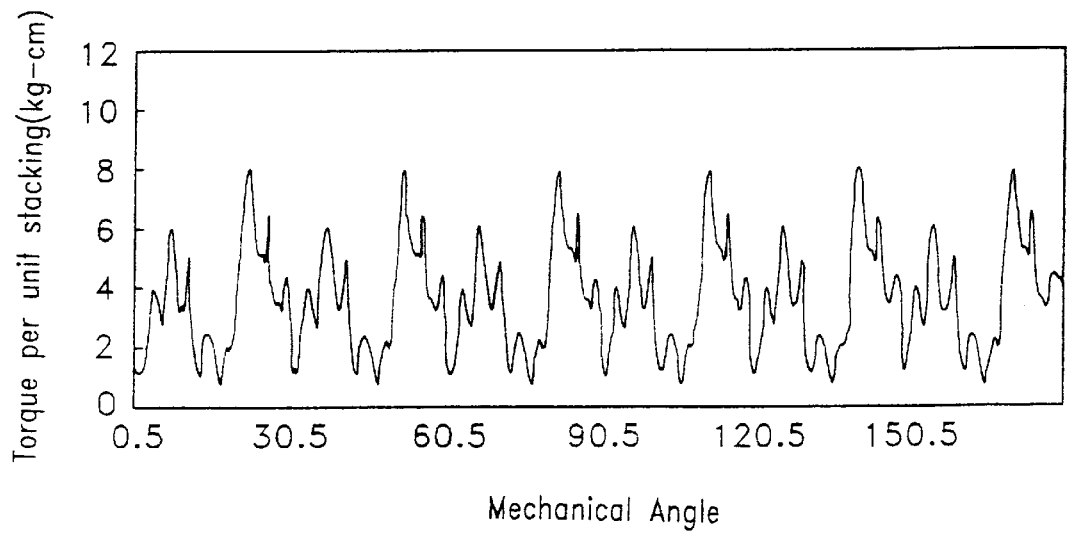
FIG. 6 shows a torque measurement graph of one embodiment of FIG. 2 of a prior art.

The torque of an embodiment according to the invention measured in the same condition of electric power consumption and magnetic amount as in the prior art of FIG. 6, has smaller ripple than that of the prior art, and the difference between the maximum torque value and the minimum torque value is small, as shown in FIG. 10. Consequently, mechanical vibration and noises are reduced and the average torque per unit stacking of the rotor steel plate 2 is about 7 kg-cm, i.e., more than twice as great that of the prior art. Furthermore, the output is increased with small electric power consumption.

According to the present invention, the rotor produces harmonious magnetic flux flow and an even magnetic flux distribution, whereby the rotor has better efficiency than prior art rotor structures during constant electric potential, and prevents mechanical vibration compared with the preponderance of the magnetic flux of prior art rotor structures. Furthermore, effective energy consumption can be obtained by the increased torque produced from a given magnetic amount as compared with prior art rotor structures.

While there has been illustrated and described what is considered a preferred embodiment of the present invention, it will be understood by those who skilled in the art that various changes and modifications may be made, and equivalents may be substituted for elements thereof without departing from the true scope of the present invention. In addition, many modifications may be made to adapt to a particular situation according to the teaching of the present invention without departing from the central scope thereof. Therefore, it is intended that the present invention not be limited to the particular embodiment disclosed, which is merely the best mode contemplated for carrying out the present invention, but that the present invention should include all embodiments falling within the scope of the appended claims.

What is claimed is:

1. A rotor adapted for use in an electrical mechanism, comprising:

a core defining a longitudinal axis;

a plurality of first slots formed in the core, each first slot extending in a direction substantially perpendicular to a radius of the core and having opposite ends;

a plurality of second slots formed in the core and extending from respective ends of the first slots, whereby there is provided a plurality of pairs of adjacently disposed second slots, the second slots of each pair extending from different first slots and converging toward one another in a direction toward an outer periphery of the core; and permanent magnets disposed in the first slots and in the second slots.

2. The rotor according to claim 1 wherein each second slot forms an obtuse angle with its respective first slot, the obtuse angle being in the range of 120° to 170 °.

3. The rotor according to claim 1 wherein there are four first slots and four pairs of second slots.

* * * * *